US006383239B1

(12) United States Patent
Suzuki et al.

(10) Patent No.: US 6,383,239 B1
(45) Date of Patent: May 7, 2002

(54) FREE ABRASIVE SLURRY COMPOSITION AND A GRINDING METHOD USING THE SAME

(75) Inventors: Yasuyuki Suzuki; Tomohiro Kaku; Isao Saito; Kazuya Orii; Yasutoshi Fujita; Masao Yamaguchi; Masahiro Sasaki, all of Tokyo (JP)

(73) Assignees: Tokyo Magnetic Printing Co., Ltd.; TDK Corporation, both of Tokyo (JP)

( * ) Notice: Subject to any disclaimer, the term of this patent is extended or adjusted under 35 U.S.C. 154(b) by 0 days.

(21) Appl. No.: 09/522,115

(22) Filed: Mar. 9, 2000

(30) Foreign Application Priority Data

| Mar. 15, 1999 | (JP) | 11-068281 |
| Jul. 21, 1999 | (JP) | 11-206120 |

(51) Int. Cl.$^7$ ............... C09K 3/14; C09G 1/02
(52) U.S. Cl. ............... 51/307; 51/308; 51/309; 106/3; 106/8
(58) Field of Search .......... 51/293, 307, 308, 51/309; 106/3, 8

(56) References Cited

U.S. PATENT DOCUMENTS

| 3,874,129 A | * | 4/1975 | Deckert et al. ............... 51/309 |
| 4,284,533 A | * | 8/1981 | Imamura et al. ............ 252/542 |
| 4,468,339 A | * | 8/1984 | Rysek et al. .................. 252/75 |
| 4,508,634 A | * | 4/1985 | Elepano et al. ............. 252/163 |
| 4,785,022 A | * | 11/1988 | Sonnenberg et al. .......... 521/57 |
| 4,925,491 A | * | 5/1990 | Perovetz et al. ............... 106/3 |
| 5,525,249 A | * | 6/1996 | Kordonsky et al. ....... 252/62.56 |
| 5,527,423 A | * | 6/1996 | Neville et al. ................. 106/3 |
| 5,767,188 A | * | 6/1998 | Kamikuri et al. ........... 524/507 |
| 5,872,088 A | * | 2/1999 | Pucci et al. .................. 510/238 |
| 5,888,950 A | * | 3/1999 | Potini et al. ................ 510/113 |
| 5,942,015 A | * | 8/1999 | Culler et al. ................. 51/295 |
| 5,962,388 A | * | 10/1999 | Sherry et al. ............... 510/238 |
| 5,968,238 A | * | 10/1999 | Healy et al. .................... 106/3 |

FOREIGN PATENT DOCUMENTS

| JP | 61-261386 | 11/1986 |
| JP | 8-41443 | 2/1996 |
| JP | 09-256171 | 9/1997 |
| JP | 10-204419 | 8/1998 |
| JP | 10-249713 | 9/1998 |
| JP | 10-255022 | 3/2000 |

OTHER PUBLICATIONS

"New Technical Development of Additives For Petroleum Products", *For Professional in Advanced Technology Field*, publication date unknown.

Hironaka, S., "Action Mechanism of Lubricant Additive", *Plastics Processing Symposium*, 1994, pp. 33–43 (No month).

Sakurai, T., "Chemistry of Lubrication and Wear", *Junkatsn*, vol. 28 9, (1983) pp. 635–642 (No month).

Mitchell, P., "Oil–Soluble Mo–S Comounds as Lubricant Additives", *Wear*, 100 (1984) pp. 281–300 (No month).

Ohmori T., et al., "Adsorption and Reaction–Mechanism of Phosphorous–Type EP Additives on Iron Surface", *Journal of Japanese Society of Tribologists*, 1990, vol. 35, No. 3, pp. 181–187 (No month).

Masafumi, M., "Basis of tribiology. Chemistry and physics of lubricant", Toraiboroji ni okeru Kiso to Oyo, vol. 27, pp. 15–34, 1996 (No month).

Hartley, R.J. et al., "Lubricant Additives. Functions of Additives. Antiwear and Extreme Pressure Additives", *Journal of Japanese Society of Triologists*, (1995), vol. 40, No. 4, pp. 326–331 (No month).

\* cited by examiner

*Primary Examiner*—Michael Marcheschi
(74) *Attorney, Agent, or Firm*—Drinker Biddle & Reath LLP (57) ABSTRACT

The present invention relates to a free abrasive slurry composition which is advantageously used in uniform grinding of a composite material composed of a plurality of materials each having different hardness, without causing selective grinding. The free abrasive slurry composition contains abrasive particles, an anti-abrasion agent as an anti-selective grinding agent and a dispersion medium and the anti-abrasive agent is a compound containing one or both of sulfur and phosphorus or hydroxyl group(s) in the molecular chain.

11 Claims, 2 Drawing Sheets

FREE ABRASIVE SLURRY COMPOSITION AND A GRINDING METHOD USING THE SAME

FIELD OF THE INVENTION

The present invention relates to a free abrasive slurry composition containing free abrasive particles which is advantageously used in uniform grinding or processing of a composite material composed of a plurality of materials having different hardness from each other, without causing difference in the grinding amount between soft materials and rigid materials, i.e. selective grinding, during lapping and polishing processes of the composite material.

PRIOR ART

Recently, higher performance and higher function have been more and more demanded for optical parts, electronic parts, precision machine parts or the like, and wide range of materials have been used for such parts, such as metallic crystalline materials, ceramics, glass, plastics and so forth.

As one of the manufacturing processes of such parts, grinding or polishing of a composite material composed of a plurality of materials having different hardness from each other is frequently introduced. Recited as examples of grinding processing of composite materials are: in the field of electronics, texturing of Ni—P plating of a hard disk substrate, uniform working of wiring metal layers and insulation films between the layers in multiple layer wiring process of LSI; and in the field of optics, grinding of the connector end faces of optical fibers consisting of a composite material composed of zirconia ceramics (so called "ferrule"), quartz glass (so called "core" of fiber) and fluoroplastics (so called "clad").

With respect to a hard disk drive (i.e. a recording medium of computer), the packing density has been increased year by year. As means to attain a higher packing density, the gap or spacing between the hard disk and a magnetic head has been reduced. In other words, reduction of the spacing of the raised head has been attempted. A magnetic head mounted on a hard disk drive is generally of a thin film type magnetic head type, and examples of this type are of an inductive type, an MR-inductive complex type wherein MR (magnet resistance) is used as a recording/reproducing element, and a type using GMR (Giant MR).

These thin film type type magnetic heads are composed of a composite material comprised of a substrate such as Altic ($Al_2O_3$—TiC), a ceramic protective/insulation film such as alumina ($Al_2O_3$), a metallic film which is a magnetic material such as permalloy (Fe—Ni) and Sendust (Fe—Al—Si) and the like.

Figure 1:
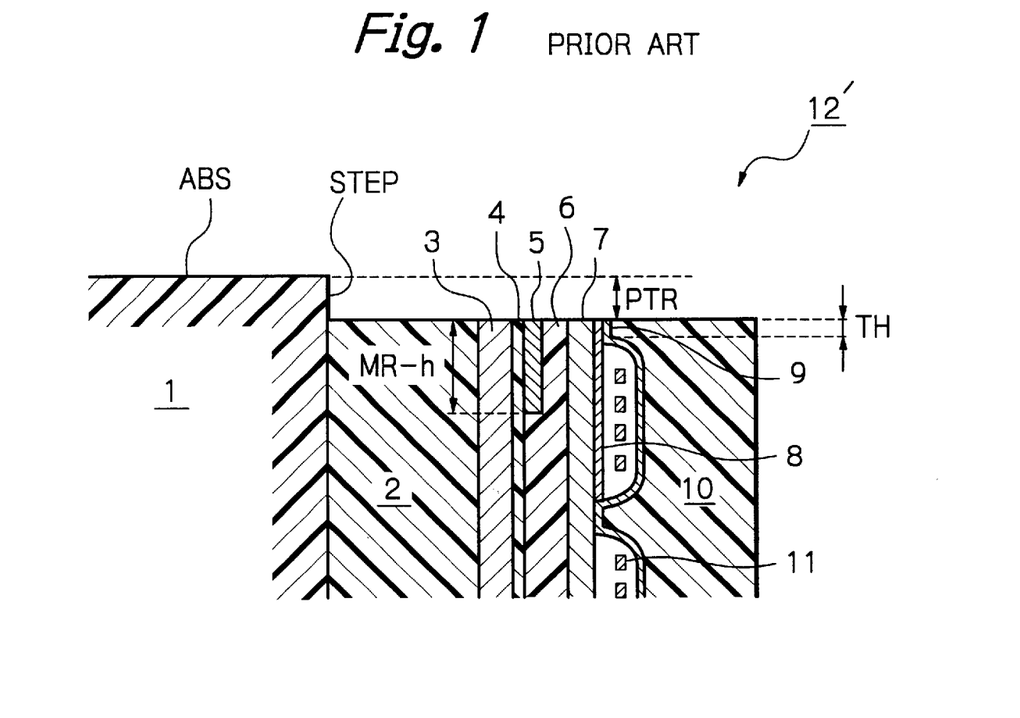
FIG. 1 is a cross-sectional view of a thin film type magnetic head to be ground, as taken along line I—I in FIG. 2.
Figure 2:
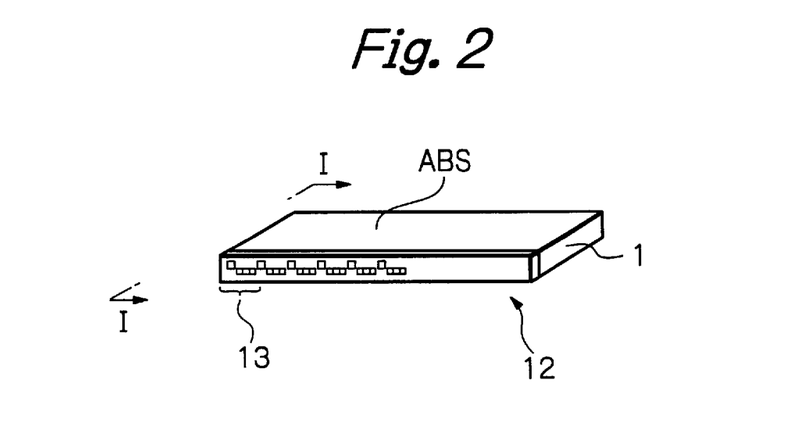
FIG. 2 shows a structure of a thin film type magnetic head.

For example, a thin-film type magnetic head 12' shown in FIGS. 1 and 2 comprises an Altic substrate 1, an alumina insulation film 2, a bottom shield film 3 (Sendust: Fe—Al—Si, permalloy: Fe—Ni or the like), an alumina film 4, an MR element 5, an alumina film 6, a head shield film 7 (permalloy or the like), an alumina film 8, a write pole tip 9 (permalloy or the like), an alumina protective film 10, and a coil conductor 11.

When a conventional free abrasive slurry is used for grinding of ABS (Air Bearing Surface) of a thin film type magnetic head, in most cases, stepped (as indicated by "STEP" in FIG. 1) or rough surface results due to selective grinding or abrasion of a metallic film made of soft materials such as permalloy and Sendust, due to difference in hardness between the materials. As a result, there is a problem in that the metallic film (such as magnetic pole portion) is recessed from ABS composed of ceramics, which is called PTR (Pole Tip Recession), increasing the magnetic spacing to a recording medium (as shown in FIG. 1), thereby leading to substantial increase in raised or floating distance of the head.

In general, lubricants have been used for grinding a composite material composed of a plurality of materials having different hardness from each other, and such lubricants are classified mainly into three categories based on mechanisms of lubrication on the materials to be ground: 1) oily agent which is fatty acid such as stearic acid and oleic acid, 2) anti-abrasion agent such as phosphoric ester and Zn-DTP, and 3) organic Mo compound.

Among them, the anti-abrasion agent lowers friction even in a severe grinding condition where the oily agent loses its lubrication action. It is known that an anti-abrasion agent forms a lubricating film as the result of a tribochemical reaction with the frictional surface in a low load condition to a a high load condition at higher temperature (Seichiro Hironaka, Action mechanism of lubricant additive, Plastic Processing Symposium, 33–43,1994; R. J. Hartley et al., Anti-abrasion agent and high-pressure agent, Tribologist, 326–331, 1995).

Among such anti-abrasion agents, those compounds containing sulfur atom in its molecular chain are decomposed by frictional heat generated on the frictional surface and form an inorganic film containing sulfide between the grinding surface and the substance to be ground, thereby maintaining a lubricating property.

In the same manner, anti-abrasion agents containing a phosphorus atom in its molecular chain are decomposed by frictional heat generated on the frictional surface and form an inorganic film consisting of phosphide or phosphate between the grinding surface and the substance to be ground. It is believed that phosphite ester compound from among such compounds containing phosphorus is hydrolyzed by frictional heat to form an inorganic film. (Toshihide Omori et al., "Adsorption and reaction on the iron surface of phosphorus high-pressure additives (second report)", Tribologist, 188–194, 1990).

It is known that compounds containing both sulfur and phosphorus atoms also exhibit the same effect as that of the compound comprising a sulfur atom alone or a phosphorus atom alone. (Masafumi Mashiko, "Chemistry and physics of lubricant", Fundamentals and applications in tribology, 15–34, 1996).

Since these inorganic films are chemisorbed to a substance to be ground, the adsorption force is stronger than that of physical adsorption of organic molecules and the film is stable up to temperatures. A large amount of energy is required in order to remove the inorganic film, and thus it is known that the lubrication effect of the film on the substance to be ground is maintained, so long as the grinding condition is not so severe that the inorganic film is removed (Toshio Sakurai, "Chemistry of lubrication and grinding", Lubrication, 635–642, 1982).

As an anti-abrasion agent, sulfur-containing organic molybdenum is also studied (P. C. H. Mitchell "Oil Soluble Mo—S Compounds as Lubricant Additive" Wear 100 (1984) 281–300; edited by Hehachiro Okabe, "Development and the Latest Technology of Additives for Petroleum Products" CMC (1988) p99–106; and so forth), and the possibility is studied for sulfur-containing organic molybdenum to be used as a lubricant for the grinding of a composite material composed of materials of various hardness (Japanese Patent Application No.10-255022).

As mentioned above, although the effects of anti-abrasion agents have been widely known, those anti-abrasion agents have been conventionally used for lowering the friction of the sliding surface of machine parts, such as the surface of a gear or a turbine. On the other hand, the load applied on a conventional composite material, such as a thin film type magnetic head composed of a plurality of materials of various hardness, during grinding is much lower than that on the sliding surface such as the surface of a gear and, therefore, it is quite possible to process a composite material without using an anti-abrasion agent. However, a uniform working have not been attained. Accordingly, no one has tried to add the anti-abrasion agent to a free abrasive slurry composition as an anti-selective grinding agent for the purpose of preventing selective grinding of a composite material composed of materials of various hardness as in the present invention.

Japanese Patent Application Nos. 10-113327 and 10-255022 propose the use of free abrasive slurry containing an anti-selective grinding agent which can achieve a sliding surface with high precision, thereby avoiding such selective grinding or damage.

In Japanese Patent Application No. 10-113327, prevention of selective grinding caused by lap processing of ABS of a thin film type magnetic head and improvement of the grinding surface condition are intended by adding polyether having a molecular weight of 300–20,000 and optionally polyether having hydroxyl group functionality of 1–6 obtained by addition reaction of propylene oxide with ethylene oxide, as an anti-selective grinding agent to free abrasive slurry.

Japanese Patent Application No. 10-255022 describes the use of a sulfur-containing organic molybdenum compound as an anti-selective grinding agent. The compound is decomposed by frictional heat generated during grinding processing and forms a film without causing any reaction with the metallic surface. The film has the layered structure wherein the layers are mainly composed of molybdenum disulfide ($MoS_2$) and bonded to each other by Van der Waals force which is a weak intermolecular force. Friction at the contact area is replaced by interlayer friction in molybdenum disulfide and is lowered. As a result, the difference in the grinding amount between materials of various hardness is reduced and selective grinding of soft materials is effectively avoided.

Various free abrasive slurry compositions containing compounds having alcoholic hydroxide groups have been suggested. The conventional free abrasive slurry composition to which alcohol is added generally utilizes an aqueous dispersion. JP-A 61-261386 discloses the use of an abrasive particle-dispersion type slurry lubricant for lapping and polishing, which is obtained by mixing/dispersing abrasive particles to a medium selected from the group consisting of polyalcohol, alkyl ether of polyalcohol, allyl ether of polyalcohol and aqueous solutions thereof, for the purpose of preventing the lowering of lapping and polishing performance due to compositional change caused by the evaporation of the lubricant component during its usage. JP-A. 9-256171 discloses an aqueous oily agent composition for processing and the processing liquid containing the same, which satisfies the following properties: processability of the surface of the Ni-coated substrate, i.e. processability in plane grinding or texturing; dispersibility of the processing liquid in which abrasive particles are dispersed; non-adherence of debris to the ground film during processing or after processing (cleaning property after processing); and excellent low error property after forming a magnetic film. Further, JP-A 8-41443, 10-204419, 10-249713 or the like discloses a free abrasive slurry composition utilizing a nonionic surfactant as an grinding particle dispersant, such as polyoxyalkylene monoalkyl ether, polyoxyalkylene monoalkylphenyl ether and polyoxyalkylene monofatty ester, which is a compound having alcoholic hydroxyl groups. However, the use of these substances are not intended to prevent selective grinding of soft materials which occurs during grinding processing of the materials of various hardness and to improve grinding rate.

However, the conventional free abrasive slurry composition has preventive effects mainly on selective grinding of metallic film, and the purpose was limited to the prevention of selective grinding only, while the raised distance of the head should be further diminished and the PTR value should be further lowered. Therefore, selective grinding of the metallic film should be avoided, and at the same time, step difference (so called "shoulder step difference") formed at the boundary between Altic (a substrate) and alumina (an insulation film) during grinding processing using free abrasive slurry should be lessened. In addition, in view of grinding ability of free abrasive slurry, there is also a problem in that, when lubricating property is enhanced too much, grinding property may be lowered and thus the grinding rate of free abrasive slurry may be lowered.

PROBLEMS TO BE SOLVED BY THE PRESENT INVENTION

The object of the present invention is to provide a free abrasive slurry composition which is advantageously used during grinding process in which a composite material comprised of materials of various hardness is uniformly ground without causing difference in the grinding amount between materials of different hardness, i.e. selective grinding.

Another object of the present invention is to provide a free abrasive slurry composition which is advantageously used in uniform grinding of a thin film type magnetic head without causing scratch on ABS of the thin film type magnetic head; and the method of grinding using the same.

The present invention provides a free abrasive slurry composition which is advantageously used during processing step (especially of a thin film type magnetic head) in which a composite material comprising materials of various hardness is uniformly ground without causing difference in the grinding amount between materials of different hardness, i.e. selective grinding, wherein the high grinding rate is maintained and the high grinding quality is attained; and an grinding method using the same.

SUMMARY OF THE INVENTION

A subject of the present invention is to provide a free abrasive slurry composition for grinding a composite material comprising materials of various hardness, said composition containing abrasive particles, an anti-abrasion agent as an anti-selective grinding agent containing at least one of sulfur and a phosphorus in its molecular chain (except sulfur-containing organic molybdenum) and a dispersion medium. Preferably the anti-selective grinding agent is added in an amount of 0.1% by weight or more in the slurry composition. Preferably, the anti-selective grinding agent may further contain at least one of members selected from the group consisting of a surfactant, a macromolecular surface modifier and a coupling agent, Another subject of the present invention is to provide a method for producing a thin film type type magnetic head including the step of grinding the surface which is to be an ABS (air bearing surface), wherein one of the above-mentioned free abrasive slurry compositions is used in the grinding process.

By using such free abrasive slurry composition, the area of solid-solid contact is reduced, thereby selectively lowering friction coefficient at the surface of the substance of lower hardness to be ground, during the grinding step of a composite material composed of a plurality of materials of various hardness. In other words, by reducing the removal amount of the materials of lower hardness, uniform grinding of the material becomes possible without causing difference in the grinding amount between material of various hardness.

Another subject of the present invention is to provide a free abrasive slurry composition for grinding a composite material composed of materials of various hardness, which comprises abrasive particles, a dispersion medium and at least one compound having alcoholic hydroxyl group(s), and optionally, a dispersant.

The present invention is a free abrasive slurry composition wherein the above-mentioned compound having alcoholic hydroxyl group(s) is primary—tertiary alcohol represented by the following formula (I):

$R^1$—OH          (I)

(wherein $R^1$ represents a $C_4$–$C_{18}$ alkyl group, an alkenyl group, an alkyl aryl group or an aryl group); or a free abrasive slurry composition wherein the above-mentioned compound having alcoholic hydroxyl group(s) is polyoxyalkylene monoether compound represented by the following formula (II):

$R^2O$—$(C_nH_{2n+1}O)_mH$          (II)

where $R^2$ represent a $C_1$–$C_{18}$ alkyl group, an alkenyl group, an alkynyl group, an alkyl aryl group or an aryl group; n is an integer from 2 to 4; and m is an integer from 1 to 4); or a free abrasive slurry composition wherein the above-mentioned compound having alcoholic hydroxyl group(s) is a polyoxyalkylene monoester compound represented by the following formula (III):

$R^3COO$—$(C_nH_{2n+1}O)_mH$          (III)

(wherein $R^3$ represents a $C_1$–$C_{18}$ alkyl group; n is an integer from 2 to 4; and m is an integer from 1 to 4).

Another aspect of the present invention is a method for producing a thin film type magnetic head including the step of grinding processing of the surface which is to be an ABS of the thin film type magnetic head, wherein one of the above-mentioned free abrasive slurry composition is used in the grinding processing.

The feature of the present invention is to avoid selective grinding of a metallic film and step difference between Altic and alumina, by using the above-mentioned free abrasive slurry composition.

When a compound having alcoholic hydroxyl group(s) is used as an anti-selective grinding agent in the present invention, it is considered that selective grinding is reduced since an alcoholic hydroxyl group, which is a polar group in the molecule, is selectively adsorbed to the metallic surface. On the other hand, with respect to Altic (a substrate) and alumina (an insulation and protective film), both interact less with the compound having alcoholic hydroxyl group(s) as compared with the metal, there is no notable difference in adsorption of the compound having alcoholic hydroxyl group(s). Therefore, it is believed that the compound has an excellent capability in avoiding selective grinding between Altic and alumina. In addition, adsorption of the alcoholic hydroxyl group to the solid surface is weaker as compared with adsorption of a carboxyl group, and thus it is expected that grinding processing in which higher grinding rate is maintained is possible by using the compound.

Accordingly, it is effective to add at least one compound having alcoholic hydroxyl group(s) to a free abrasive slurry composition in order to attain uniform grinding without causing difference in the grinding amount between materials of various hardness during grinding a composite material, and to maintain effectiveness of grinding of free abrasive slurry, i.e. higher grinding rate.

MODES FOR WORKING THE INVENTION

In one embodiment of the present invention, the slurry is a free abrasive slurry composition containing abrasive particles, an anti-abrasion agent as an anti-selective grinding agent, and a dispersion medium. Followings are the explanations for each component.

An anti-abrasion agent as an anti-selective grinding agent has an effect of improving grinding performance of free abrasive slurry composition. Especially, an anti-selective grinding agent containing a sulfur atom alone or a phosphorus atom alone or containing both improves frictional properties in boundary lubrication. Specifically, such agent forms a lubricating film by tribochemical reaction with the frictional surface at from low to medium loads at higher temperatures, thereby reducing friction.

Examples of anti-abrasion agents as anti-selective grinding agent include phosphoric ester, metal dithiophosphoric acid salt, phosphoric ester amine salt and sulfur compound.

Examples of phosphoric ester include: phosphoric ester represented by the following formula:

(R is alkyl or arylalkyl); tricresyl phosphate (TCP) represented by the following formula:

tricresyl phosphite (TCPi); triphenyl phosphate (TPP); diphenyl phosphate (DPP); triphenyl phosphite (TPPi); diphenyl phosphite (DPPi); cresyldiphenyl phosphate (CDP); triallyl phosphate represented by the following formula:

$(CH_2\!=\!CHCH_2O)_3$—P=O;

trioleyl phosphate; and molybdenum phosphoric ester. Among them, phosphoric ester, tricresyl phosphate and triallyl phosphate are preferred.

Examples of metal dithiophosphoric acid salt include zinc dithiophosphate (Zn-DTP) represented by the following formula:

where R is an alkyl or alkylaryl group;
phosphosulfrated polyolefin represented by the following formula:

where R is an alkyl or alkylaryl group;
barium thiopyrophosphate represented by the following formula:

where R is an alkyl or alkylaryl group;
nickel thiophosphate represented by the following formula:

where R is an alkyl or alkylaryl group;
nickel dithiophosphate (Ni-DTP); and cobalt dithiophosphate (Co-DTP). Among them, zinc dithiophosphate (Zn-DTP), phosphosulfrated polyolefin, barium thiopyrophosphate and nickel thiophosphate are preferred.

Examples of sulfur compound include sulfurated fatty ester; isobutylene sulfide; sulfurated sperm oil; sulfurated terpene; sulfurated sperm oil; diphenyl monosulfide (DPMS); and diphenyl disulfide (DPDS). Among them, sulfurated fatty ester is preferred.

Among these anti-selective grinding agents, phosphoric ester and metal dithiophosphoric acid salt are preferred, and especially, zinc dithiophosphate, phosphoric ester (wherein R in the above formula represents an alkyl group or alkylaryl), tricresyl phosphate and triallyl phosphate are more preferred.

Since these anti-selective grinding agents form an inorganic film between them and a substance to be ground, abrasion and seizure are avoided even at higher loads at higher temperatures. These agents can be used alone or in combination, in accordance with the desired grinding performances.

In this embodiment of the present invention, the amount of the anti-selective grinding agent is 0.1 wt % or more, preferably 0.5 wt % or more, more preferably 1.0 wt % or more. If the amount is below 0.1 wt %, the amount of the additive having an effect on the substance to be ground is small and uniform grinding of a plurality of materials each having different hardness becomes difficult.

Another embodiment of the present invention is a free abrasive slurry composition comprising: a compound having alcoholic hydroxyl group(s) as an anti-selective grinding agent; a dispersion medium; abrasive particles; and optionally, a dispersant, such as a surfactant. The present inventors made intensive and extensive studies for attaining low PTR value, in order to solve the above-mentioned problems of selective grinding among Altic, alumina and a metallic film which is caused during grinding processing of a thin film type magnetic head wherein low PTR value is demanded. As a result, they found that the use of a free abrasive slurry composition containing at least one compound having alcoholic hydroxyl group(s) as an anti-selective grinding agent avoids selective grinding which occurs during lapping processing, and low PTR value can be attained while maintaining a high grinding rate.

Examples of compounds having alcoholic hydroxyl group (s) to be used in the present invention include alcohol, polyoxyalkylene monoether compound and polyoxyalkylene monoester compound.

Alcohol to be used in the present invention is primary—tertiary alcohol, preferably primary alcohol, represented by the following formula:

$$R^1—OH \qquad (I)$$

where $R^1$ represents a $C_4$–$C_{18}$, preferably $C_{10}$–$C_{18}$, more preferably $C_{10}$–$C_{14}$ alkyl group, an alkenyl group, an alkynyl group, an alkyl aryl group or an aryl group, preferably an alkyl group). Examples of such alcohol include 1-butanol, isobutanol, 2-butanol, tert-butanol, 1-buten-3-ol, 3-buten-1-ol, 2-buten-1-ol, 1-butyn-3-ol, 2-butyn-1-ol, 3-butyn-1-ol, 1-pentanol, 2-pentanol, 3-pentanol, tert-amyl alcohol, 3-methyl-1-butanol, 1-penten-3-ol, 2-penten-1-ol, 4-penten-1-ol, 2-methyl-3-buten-2-ol, 3-methyl-2-buten-1-ol, 3-methyl-3-buten-1-ol, 1-pentin-3-ol, 2-pentin-1-ol, 3-pentin-1-ol 4-pentin-1-ol, 4-pentin-2-ol, 1-hexanol, 2-hexanol, 3-hexanol, 2-methyl-1-pentanol, 3-methyl-1-pentanol, 2-methyl-2-pentanol, 3-methyl-2-pentanol, 3-methyl-3-pentanol, 4-methyl-1-pentanol, 4-methyl-2-pentanol, 3,3-dimethyl-1-butanol, 3.3-dimethyl-2-butanol, 2,2-dimethyl-1-butanol, 2-ethylbutanol, 1-hexen-3-ol, 2-hexen-1-ol, 3-hexen-1-ol, 4-hexen-1-ol, 5-hexen-1-ol, 2,4-hexadien-1-ol, 1-hexyn-3-ol, 2-hexyn-1-ol, 3-hexyn-1-ol, 5-hexyn-1-ol, 5-hexyn-3-ol, 3-methyl-1-pentin-3-ol, 1-heptanol, 2-heptanol, 3-heptanol, 4-heptanol, 3-ethyl-3-pentanol, 2-methyl-2-hexanol, 2-hepten-1-ol, 4-hepten-1-ol, 1-heptyn-3-ol, 2-heptyn-1-ol, 3-heptyn-1-ol, 4-heptyn-2-ol, 5-heptyn-3-ol, 5-methyl-1-hexyn-3-ol, 1-octanol, 2-octanol, 3-octanol, 4-octanol, 2-methyl-2-heptanol, 3-methyl-3-heptanol, 4-methyl-4-heptanol, 5-methyl-1-heptanol, 5-methyl-2-heptanol, 5-methyl-3-heptanol, 6-methyl-2-heptanol, 6-methyl-3-heptanol, 2,2-dimethyl-3-hexanol, 2,3-dimethyl-2-hexanol, 2,5-dimethyl-2-hexanol, 2,5-dimethyl-3-hexanol, 3,4-dimethyl-3-hexanol, 3,5-dimethyl-3-hexanol, 2-ethyl-1-hexanol, 3-ethyl-2-methyl-3-pentanol, 1-decanol, 1-dodecanol, 1-tetradecanol, 1-hexadecanol and 1-octadecanol. Among them, 1-decanol, 1-dodecanol and 1-tetradecanol are preferred.

Polyoxyalkylene monoether compound to be used in the present invention is represented by the following formula:

$$R_2O—(C_nH_{2n+1}O)_mH \qquad (II)$$

(wherein $R^2$ represents a $C_1$–$C_{18}$, preferably $C_1$–$C_{10}$, more preferably $C_1$–$C_4$ alkyl group, an alkenyl group, an alkynyl group, an alkyl aryl group or an aryl group, preferably an alkyl group; n is an integer from 2 to 4, preferably from 2 to 3; more preferably 2; m is an integer from 1 to 4, preferably 1 or 2). Examples of the compounds include 2-methoxyethanol, 2-ethoxyethanol, 2-n-propoxyethanol, 2-isopropoxyethanol, 2-butoxyethanol, 2-isobutoxyethanol, 2-(hexyloxy)ethanol, 2-(dodecyloxy)ethanol, 2-(allyloxy) ethanol, 2-phenoxyethanol, 2-(benzyloxy)ethanol, 2-(2-methoxyethoxy)ethanol, 2-(2-ethoxyethoxy)ethanol, 2-(2-butoxyethoxy)ethanol, 2-(2-isobutoxyethoxy)ethanol, 2-(2-tert-butoxy)ethanol, 2-[2-(hexyloxy)ethoxy]ethanol, 2-[2-(dodecyloxy)ethoxy]ethanol, 2-[2-(tetradecyloxy)ethoxy] ethanol, 2-[2-(hexadecyloxy)ethoxy]ethanol, 2-[2-octadecyloxy]ethoxy]ethanol, 2-[2-(2-methoxyethoxy) ethoxy]ethanol, 2-[2-(2-ethoxyethoxy)ethoxy]ethanol, 2-[2-(2-butoxyethoxy)ethoxy]ethanol, 2-[2-[2-(dodecyloxy) ethoxy]exhoxy]ethanol, 2-[2-[2-(tetradecyloxy)ethoxy] ethoxy]ethanol, 1-methoxy-2-propanol, 1-ethoxy-2-propanol, 1-butoxy-2-propanol, 1-phenoxy-2-propanol, 2-(2-methoxypropoxy)propanol, 2-[2-(octylphenyloxy) ethoxy]ethanol, 2-[2-(nonylphenyloxy)ethoxy]ethanol and 2-[2-(dinonylphenyloxy)ethoxy]ethanol. Among them, 2-ethoxyethanol is especially preferred.

A polyoxyalkylene monoester compound to be used in the present invention is represented by the following formula:

$$R^3COO-(C_nH_{2n+1}O)_mH \qquad (III)$$

(wherein $R^3$ represents a $C_1-C_{18}$, preferably $C_1-C_{10}$, more preferably $C_1-C_3$ alkyl group; n is an integer from 2 to 4, preferably from 2 to 3, more preferably 2; m is an integer from 1 to 4, preferably 1 or 2). Examples of the compounds include 2-hydroxyethyl acetate, 2-hydroxyethyl caprylate, 2-hydroxyethyl caprylate, 2-hydroxyethyl laurate, 2-hydroxyethyl palmitate, 2-hydroxyethyl oleate and polyethylene glycol monooleate 2EO.

The use of a free abrasive slurry composition containing at least one of the above-mentioned compounds having alcoholic hydroxyl group(s) can avoid selective grinding of soft materials which may occur during grinding of materials of various hardness and can minimize the step difference between metal and ceramics without lowering the grinding efficiency (grinding rate).

Boiling point of the compound having alcoholic hydroxyl group(s) to be used in the present invention is 80 ° C. or more, preferably 100° C. or more. Such boiling points are selected since an anti-selective grinding agent having higher evaporation rate may be evaporated during grinding operation and thus grinding process may become difficult.

When the compound having alcoholic hydroxyl group(s) in the present invention is used as an anti-selective grinding agent, the amount is 0.5 wt % or more, preferably 1.0 wt % or more, more preferably 1.0–50 wt % or more, relative to the weight of the free abrasive slurry composition.

It is desired that the dispersion medium to be used in the present invention is a non-aqueous solvent, or preferably a non-polar solvent of extremely low polarity, since metallic films, such as a film made of permalloy or Sendust, as components of the thin film type magnetic head are generally susceptible to water and may be rusted. The term "polarity of dispersion medium" has the meaning which is generally used, and means properties based on dipole generated in a molecule which generation depends on types of atoms in the dispersion medium molecules and the types of bonding of the atoms, atomic groups and stereochemistry thereof. The magnitude of the polarity is determined relatively by the polarity of the interacting molecules. The polarity of the solvent is qualitatively represented by δ value (solubility parameter (sp value) of Hildebrand). The larger the δ value is, the larger the polarity becomes, and vice versa. The δ value is classified into several categories depending on dispersibility, orientation by the polarity and intermolecular interactions (such as hydrogen bonding), and the value determines the dissolution selectivity of the solvent to the compound, i.e., which compound is dissolved easily in the solvent. As the organic solvent which is suitable as a dispersion medium for the free abrasive slurry grinding liquid of the present invention, one having the low δ value is desired. If the δ value is not low, the amount of polar components increases and odor is generated from the dispersion medium, or the dispersion medium itself may harm human body and the substance to be ground.

Moreover, in the present invention, a dispersion medium having a low evaporation rate is suitable in order to avoid evaporation of grinding slurry during grinding processing thereby performing stable grinding processing. If the dispersion medium has a high evaporation rate, dispersion medium will be evaporated during the grinding operation and thus the grinding processing may be unstable. From the viewpoint mentioned above, the dispersion medium to be used in the present invention preferably has: a boiling point of 100° C. or more, preferably 120 ° C. or more; a solubility parameter (sp value) of 10.0 or less, preferably 8.0 or less; and a relative velocity of 5.0 or less, more preferably 2.0 or less. Examples of such dispersion media include an odorless isoparaffin solvent (Isopar series) and an low-odor naphthene solvent (EXXSOL series), manufactured by Exxon Chemical, Co.; an n-paraffin solvent (Whiterex series), and an industrial aliphatic solvent, such as Pegasol, Pegawhite and Sertrex, manufactured by Mobil Chemical Examples of dispersion media include a surfactant, a macromolecular compound and a surface modifier, and they can be used in combination.

In order to prepare a stable dispersion system from powder, the powder should have excellent wetting property at solid/liquid interface. The term "wetting property" herein means a phenomenon in which liquid pushes out gas from the surface of the solid. Onto the surface of dried powder, air is strongly adsorbed and thus should be replaced by liquid. In order to improve wetting properties, chemical affinity between solid and liquid phases should be enhanced. The affinity may be larger when the polarities and chemical structures of both phases are similar. Conventional grinding particles generally exhibit hydrophilic property, since the surface thereof has polar functional groups, such as hydroxyl groups. Therefore, conventional abrasive particles can be easily dispersed in a polar solvent having a high δ value, such as water, because of excellent wetting properties. However, the dispersion medium to be used in the present invention is a non-polar solvent, and in order to uniformly disperse the abrasive (hydrophilic particles) into the non-polar solvent, the affinity between the particle surface and the dispersion medium should be enhanced, and thus the particle surface should be treated so that it has hydrophobic nature. Examples of methods for hydrophobic treatment includes addition of a dispersant, such as a surfactant.

The method in which a surfactant is used as a dispersant is based on the fact that the surfactant is an amphiphilic material having a long hydrocarbon chain (which gives hydrophobic nature) and having a strong polar group at the terminus (which gives hydrophilic nature) in its molecule. Specifically, the particle surface (which is hydrophilic) interacts with the polar group of the surfactant, and the surfactant molecule attaches to the surface so that the hydrocarbon chain (which is hydrophobic) faces outside. In other words, the particle surface as a whole changes its hydrophilic nature into hydrophobic nature. As a result, the particles stay in a non-polar solvent without precipitating.

The surfactant to be used as a dispersant in the present invention should be soluble in a non-polar solvent. Such a surfactant generally has double bonding or triple bonding or branches in its molecular structure.

Examples of such surfactants include: sorbitan fatty ester, such as sorbitan monooleate, sorbitan sesquioleate and sorbitan trioleate; glycerin ester, such as decaglyceryl pentaoleate, decaglyceryl pentaisostearate, decaglyceryl trioleate, hexaglyceryl pentaoleate, glyceryl monoisostearate and diglyceryl monoisostearate; polyoxyethylene sorbit fatty ester, such as polyoxyethylene sorbit tetraoleate; polyethylene glycol fatty ester, such as polyethylene glycol monooleate 2EO and 6EO; and polyoxyethylene alkyl ether, such as POE(2) oleyl ether and POE(3) secondary alkyl ether. There is no limitation with respect to the amount of the surfactant to be used in the present invention, as long as it is large enough to reach saturation in adsorption by particles, and therefore, it varies depending on the surface properties of the abrasive particles and the types of surfactant. It is because the amount of the adsorbed surfactant as the first layer of the particle in the non-polar solvent is smaller, as compared with the case of an aqueous system, and thus the formation of the second layer by the adsorbed surfactant utilizing hydrophobic-hydrophobic interaction of surfactants becomes difficult, and the surface nature is not changed by the increase in the amount of the surfactant, while in the case of aqueous system, nature is changed as the amount increases.

As a dispersant, a surface modifier, such as a macromolecular compound and a silane coupling agent, can be used. Examples of such macromolecular surface modifier include a polymer brush wherein the terminus thereof is strongly adsorbed to the interface and the remaining parts is extending into the solvent, such as poly(2-vinylpyridine)-polystyrene (PVPy-PS) and poly(2-vinylpyridne)-polyisoprene (PVPy-PIS). Macromolecular compounds are adsorbed onto the particle surface, and form a thick adsorption layer. By this thick adsorption layer, access of the particles to each other are sterically hindered. In the method in which a surface modifier is used, the surface functional group on the particle surface is bonded with the surface modifier by chemical reaction, and the particle surface changes its hydrophilic nature into hydrophobic nature. The hydrophilic abrasive particles can be uniformly dispersed into the non-polar solvent not only by the above-mentioned method but also by hydrophobic treatment.

Examples of coupling agents include a silane coupling agent, such as vinyl trichlorosilane, vinyltris(β-methoxyethoxy)silane, vinyltriethoxysilane, vinyltrimethoxysilane, γ-(methacryloxypropyl)trimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)γ-aminopropyltrimethoxysilane, N-β-(aminoethyl)γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane; a titanate coupling agent, such as isopropyltriisostearoyl titanate, isopropyltridodecylbenzenesulfonyl titanate, isopropyltris(dioctylpyrophosphate)titanate, tetraisopropylbis(dioctylphosphite)titanate, tetraoctylbis(ditridecylphosphite)titanate, tetra(2,2-diallyloxymethyl-1-butyl)bis(ditridecyl)phosphite titanate, bis(dioctylpyrophosphate)oxyacetate titantate (Plenact KR138S, manufactured by Ajinomoto), bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate)titanate, isopropyltricumylphenyl titanate, isopropyltri(N-amidoethylaminoethyl)titanate, dicumylphenyl oxyacetate titanate and diisostearoylethylene titanate; and an organic aluminum coupling agent, such as acetoalkoxy aluminum diisopropylate (Plenact A1-M, manufactured by Ajinomoto KK), acetoalkoxy diisopropylate, isobutyloxide, 2-octadecyloxide, and 2-ethylhexylisopropoxide.

The amount of the macromolecular surface modifier or coupling agent varies depending on the surface properties of the abrasive particles to be used, however, generally is 0.01% by weight, preferably 0.05–5.0% by weight.

There is no limitation with respect to the abrasive particles, as long as it is the abrasive generally used for grinding processes. Examples include diamond, alumina, silicon carbide, cerium oxide, zirconium oxide, silicone oxide and iron oxide. For processing a thin film type magnetic head, the substrate is hard Altic and thus diamond abrasive particles are used. The diameter of the diamond particles is generally 1.0 micron or less, more preferably 0.5 micron or less. With respect to the crystal structure of diamond, there are two types depending on the manufacturing method, and either types can be used in according with the grinding purposes. The amount of diamond particles to be added to free abrasive slurry is generally 0.05–1.0% by weight, and it is adjustable using grinding efficiency or the quality of the grinding surface as a criterion.

As a method for producing a free abrasive slurry composition of the present invention, general methods for producing free abrasive slurry can be applied. Specifically, the adequate amount of abrasive particles is mixed to a dispersion medium to which the adequate amount of a surfactant or the like can be dissolved. Since the surface of the abrasive particle is hydrophilic in this condition, the particles form agglomeration in the non-polar solvent. In order to obtain primary abrasive particles from the agglomeration of the particles, dispersion is conducted. In the dispersion process, the conventional dispersion methods and the conventional dispersion devices can be used. For example, an ultrasonic dispersion device, various beads mill dispersion devices, a kneader and a ball mill can be used. By using a dispersion device, agglomeration of the particles is degraded to primary particles, and the newly exposed surface adsorbs a surfactant, and as a result of improving the wetting properties, slurry having excellent dispersibility which cause no agglomeration can be obtained.

The substance to be ground in the present invention is a composite material which is the mixture of soft material having Vickers' hardness (Hv) of 26–360 and rigid material having Vickers' hardness of 700–4,000. Each of the soft material and the rigid material may consist of a single material or a plurality materials. The soft material is especially a metal, and examples include Ti (Hv:60), Pb (Hv:37), Ag (Hv:26), W (Hv:360), V (Hv:55), Nb (Hv:80), Ta (Hv:355), Pb (Hv:38), Cr (Hv:130), Ru (Hv:350), Cu (Hv:117), Pt (Hv:39), Mo (Hv:160), Th (Hv:38), Ni (Hv:60), Sendust (Fe—Al—Si, Hv:600), permalloy (Fe—Ni, Hv:200) and aluminum (Hv:200). The rigid material is especially ceramics and glass, and examples include quartz glass (Hv:620), Altic ($Al_2O_3$—TiC, Hv:2,500), TiC (Hv:3,200), AlN Hv:1,370), $Si_3N_4$ (Hv:2,160), $ZrO_2$ (Hv:700), cBN (Hv:4,000), SiO$_2$ (Hv:620), SiC (Hv:2,400), hBN (Hv:4,700), Altic (Hv:2,500), Al$_2$O$_3$ (Hv:2,000), Si$_3$N$_4$ (Hv:2,160), AlN (Hv:1,370), MgO (Hv:920), B$_4$C (Hv:3,200) and TaN (Hv:1,080).

Especially, when the substance to be ground is a thin film type magnetic head, this substance has the structure shown in FIG. 1 which comprises the mixture of materials of various hardness, such as Altic, Sendust, permalloy and alumina.

The method for measuring Hv is defined by JIS Z225 1. Specifically, in the method, diamond square pyramid penetrator having an angle between opposite faces of 136° is used to make a recess on a test sample. A test load at the moment is measured, and the surface area of the recess is obtained from the diagonal length of the recess. Using these values, Hv can be calculated by the following formula:

$$Hv=0.102(F/S)=0.102 \cdot (2F\sin \theta/2)/d^2=0.18909F/d^2$$

wherein Hv represents Vickers' hardness, F represents test load (N), S represents a surface area of the recess, d represents the average diagonal length of the recess (mm), and θ represents an angle between opposite faces of the diamond penetrator. The devices to be used in the test of Vickers' hardness is defined in JIS B7725, and the standard piece as a criterion for the hardness is defined as a piece made of steel (JIS G4401, JIS G4805), brass (JIS H3100) or copper (JIS H3100). With respect to the standard piece, the roughness of the surface used for the test is defined to be a specular surface of 0.1 s according to JIS B0601 (surface roughness), and the parallelism of the upper side and the under side of the standard piece is defined to be 0.02 mm or less per 50 mm according to JIS B0621 (definition and indication with respect to accuracy of shape and location).

The free abrasive slurry composition of the present invention can be applied to any composite material of various hardness and various surface properties, and examples include an optical fiber connector, a semiconductor element, a VTR head and a floppy head. The present invention is described below in reference to the processing of a thin film type magnetic head.

Figure 3:
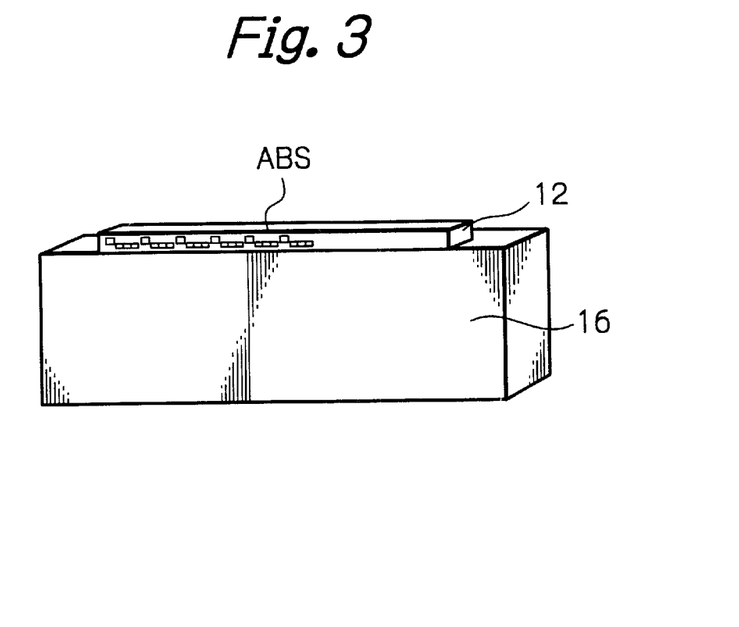
FIG. 3 is a perspective view in which a bar cut out is attached to a processing fixture.
Figure 4:
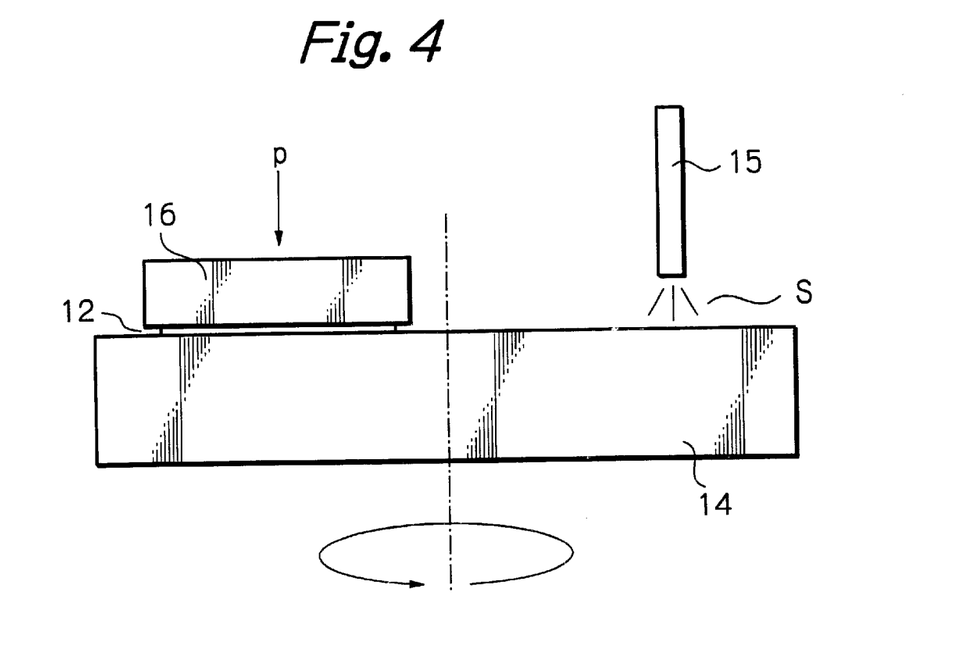
FIG. 4 shows a perspective view which exemplifies lapping processing of a bar.

The raised magnetic head is manufactured in the following steps:
1. Cutting out a bar. A bar is cut out from a wafer in which a number of magnetic conversion elements are arranged in matrix. As shown in FIG. 2, in a bar, a plurality of sliders containing magnetic transducer element 13 are arranged in rows.
2. As shown in FIG. 3, the bar 12 is fixed with glue to a processing fixture.
3. Lapping processing. As shown in FIG. 4, grinding of ABS of the slider is conducted by: rotating a surface plate mainly comprising tin; placing a substrate to be ground (the bar 12 fixed onto the processing fixture 16) onto the rotated plate 14 under pressure p; and supplying free abrasive slurry s and the like from supplying nozzle 15.
4. Removing the bar 12 from the processing fixture 16.
5. Conducting rail etching processing.
6. Cutting the bar 12 into sliders.

Among these steps, the present invention relates to the grinding of the bar at lapping processing (step 3). The conventional grinding processing of ABS of slider is conducted using free abrasive slurry with controlled throat height and MR height.

The term "throat height (TH)" means one of the factors determining the recording property of a thin film type magnetic head, and is defined as a distance at magnetic pole portion between ABS and the terminus of the insulator which electrically isolates a film coil (indicated as TH in FIG. 1).

A thin film type magnetic head having a magnetic resistance reproducing element is called an MR-inductive composite head, and with respect to this MR-inductive composite head, the height of the magnetic resistance reproducing element is one of the factors which determines recording/reproducing property and this is called MR-height (MR-h). The MR-height is a length of the magnetic resistance reproduction element whose terminus is exposed at ABS, wherein the measurement is made from ABS (indicated as MR-h in FIG. 1).

EXAMPLES

Examples 1–8, Comparative Examples 1–3

In the present Examples, the effect of lubricant at grinding processing of a thin film type magnetic head comprising Altic, Sendust and permalloy was studied.

The components of the free abrasive slurry composition used in the present Examples are shown in Table 1. Isopar M which is a non-polar solvent was used as a dispersion medium, and sorbitan monooleate (SP-O10, manufactured by Kao, Co.) which is a non-ionic surfactant was used as a surfactant.

As lubricants (anti-abrasion agent), each of zinc dithiophosphate (Z-112, manufactured by Asahi Denka Kogyo KK), phosphosulfrated polyolefin (ADDITIN, manufactured by Nippon Yushi KK), barium thiopyrophosphate (LUBRIZOL, manufactured by Nippon Lubrizol KK), nickel thiophosphate (Irgalub, manufactured by Ciba Specialty Chemicals KK), tricresyl phosphate ((reagent), manufactured by Kanto Kagaku KK), triallyl phosphate ((reagent), manufactured by Kanto Kagaku KK), phosphoric ester (PHOSPHANOL, manufactured by Toho Kagaku Kogyo KK), sulfurated fatty ester (Mobiladce DO, manufactured Dainippon Ink Kagaku KK) were used in respective Examples and Comparative Examples.

As controls, tests were conducted in the same manner except that slurry with no lubricant (anti-abrasion agent), or slurry with either of oleic acid (reagent manufactured by Wako Junyaku) or macadamia nut oil (reagent manufactured by Nikko Chemicals KK) which is an oily agent as a lubricant, was used instead of the slurry containing the above-mentioned material.

For grinding test, an automatic precision lapping machine HYPREZ model EJ-3801 (manufactured by Nippon Engis) was used. Followings are the grinding conditions: a tin/lead surface plate was used as a lapping plate; the rotation rate of the surface plate was 60 rpm; the slurry grinding liquid was supplied by spraying for 3 seconds at intervals of 30 seconds; processing load was 1,300 g/cm$^2$; and the processing was conducted for 30 minutes.

The grinding properties were evaluated by measuring the step difference between aluminatitan carbide and the metallic film of the thin film type type magnetic head after grinding processing, i.e. pole tip recession value, using a scanning probe microscope (AFM). The PTR value varies depending on the required performance, however, it is generally considered that approximately 10 nm or less, especially 5 nm or less is preferred. For the evaluation of scratching, AFM and a differential interference microscope were used. The results are shown in Table 1.

TABLE 1

| Composition (wt %) | Ex. 1 | Ex. 2 | Ex. 3 | Ex. 4 | Ex. 5 | Ex. 6 | Ex. 7 | Ex. 8 | Comparative Ex. 1 | Comparative Ex. 2 | Comparative Ex. 3 |
|---|---|---|---|---|---|---|---|---|---|---|---|
| Diamond abrasive | 0.1 | 0.1 | 0.1 | 0.1 | 0.1 | 0.1 | 0.1 | 0.1 | 0.1 | 0.1 | 0.1 |
| Surfactant (SP-O10) | 1.0 | 1.0 | 1.0 | 1.0 | 1.0 | 1.0 | 1.0 | 1.0 | 1.0 | 1.0 | 1.0 |
| Phosphosulfrated polyolefin | 10.0 | — | — | — | — | — | — | — | — | — | — |
| Zinc dithiophosphate | — | 10.0 | — | — | — | — | — | — | — | — | — |
| Barium thiopyrophosphate | — | — | 10.0 | — | — | — | — | — | — | — | — |
| Nickel thiophosphate | — | — | — | 10.0 | — | — | — | — | — | — | — |
| Phosphoric ester | — | — | — | — | 10.0 | — | — | — | — | — | — |
| Tricresyl phosphate | — | — | — | — | 10.0 | — | — | — | — | — | — |
| Thallyl phosphate | — | — | — | — | — | — | 10.0 | — | — | — | — |
| Sulfurated fatty ester | — | — | — | — | — | — | 10.0 | — | — | — | — |
| Oleic acid | — | — | — | — | — | — | — | — | 10.0 | — | — |
| Macadamia nut oil | — | — | — | — | — | — | — | — | — | 10.0 | — |
| Dispersion medium (Isopar M) | 88.9 | 88.9 | 88.9 | 88.9 | 88.9 | 88.9 | 88.9 | 88.9 | 88.9 | 88.9 | 88.9 |
| Scratch evaluation | good | good | good | good | good | Good | good | good | good | poor | poor |
| PTR value (nm) | 3.97 | 3.40 | 3.93 | 4.01 | 3.82 | 4.00 | 4.12 | 3.97 | 5.98 | 6.67 | 10.64 |

As is apparent from the above results, PTR value of the thin film type magnetic head ground using a sulfur- and/or phosphorus-containing anti-abrasion agent became lower than the values in the case of oleic acid or macadamia nut oil or nothing was used (as in Comparative Examples), and the thin film type magnetic head composed of a composite material comprising materials of various hardness was uniformly ground.

Example 9

In the present Example, the effective amount of the anti-abrasion agent in the free abrasive slurry composition was evaluated. As an anti-abrasion agent, zinc dithiophsphate was used in various amounts. Grinding test was conducted in the same manner as in Example 1. The formulation of the slurry and the results are shown in Table 2.

TABLE 2

| Amount (wt %) | 0.001 | 0.005 | 0.01 | 0.05 | 0.075 | 0.1 | 0.5 | 1 | 5 | 10 | 50 | 80 |
|---|---|---|---|---|---|---|---|---|---|---|---|---|
| PTR (nm) | 10.50 | 9.23 | 7.73 | 5.11 | 4.02 | 3.82 | 3.83 | 3.79 | 3.85 | 3.82 | 3.77 | 3.81 |

As is apparent from the result in Examples 1–9, excellent PTR values (5 nm or lower) were obtained by adding 0.075 wt % of an anti-abrasion agent including both sulfur and phosphorus. PTR values became stable when the amount of the anti-abrasion agent is 0.1 wt % or more. In view of the results above, it was found that when the amount of the anti-abrasion agent is 0.1 wt % or more, a composite material comprising materials of various hardness can be uniformly processed.

As is apparent from the result of Examples, by adding 0.1 wt % or more of a sulfur and/or phosphorus-containing anti-abrasion agent to a free abrasive slurry composition, it became possible to uniformly abrade a composite material comprising materials of various hardness without causing selective grinding of soft material due to difference in the hardness.

Example 10

In the present Example, the prevention effect against selective grinding during grinding processing of a thin film type magnetic head comprising Altic, Sendust and permalloy was examined. In addition, slurry containing either oleic acid or stearic acid, both known as auxiliary abrasive, and slurry with no additives, were compared with the slurry of the present invention. The composition of free abrasive slurry used in Example and Comparative Example is shown in Table 3.

TABLE 3

| Material | Weight ratio (wt %) |
|---|---|
| 0–0.25 µm diamond particle | 0.1 |
| Surfactant (SP-O10) | 1.0 |
| Compound having alcoholic hydroxyl group(s) | 10.0 |
| Dispersion medium (Isopar M) | 88.9 |
| Total | 100 |

Isopar M which is a non-polar solvent was used as a dispersion medium, and sorbitan monooleate (SP-O10, manufactured by Nikko Chemicals KK) which is a non-ionic surfactant was used as a surfactant.

For grinding test, an automatic precision lapping machine HYPREZ model EJ-3801 (manufactured by Nippon Engis KK) was used. Followings are the grinding conditions: a tin/lead surface plate was used as a lapping plate; the rotation rate of the surface plate was 60 rpm; the slurry grinding liquid was supplied by spraying for 3 seconds at intervals of 30 seconds; processing load was 1,300 g/cm$^2$; and the processing was conducted for 30 minutes.

The grinding properties were evaluated by measuring step difference between Altic and the metallic film of the thin-film type magnetic head after grinding process, i.e. pole tip recession value (PTR value), using a scanning probe microscope (AFM). When the PTR value of a thin film type magnetic head was 5 nm or less, it is evaluated as "good". For the evaluation of scratching and surface roughness, AFM and a differential interference microscope were used.

Grinding rate was measured from the change in weight of ground substance before and after the grinding process which had been conducted for 30 minutes under the above-mentioned conditions.

The results are shown in Table 4.

TABLE 4

| No | Material | PTR (nm) | Grinding surface | Grinding rate |
|---|---|---|---|---|
| 1 | 1-butanol | 2.69 | good | 132 |
| 2 | 1-butanol | 2.67 | good | 136 |
| 3 | 1-hexanol | 2.66 | good | 137 |
| 4 | 1-hexanol | 2.70 | good | 141 |
| 5 | 1-octanol | 2.67 | good | 137 |
| 6 | 1-octanol | 2.64 | good | 135 |
| 7 | 2-ethyl-1-hexanol | 2.63 | good | 134 |
| 8 | 2-ethyl-1-hexanol | 2.64 | good | 136 |
| 9 | 1-decanol | 2.65 | very good | 135 |
| 10 | 1-decanol | 2.86 | very good | 141 |
| 11 | tetradecyl alcohol | 2.95 | very good | 142 |
| 12 | tetradecyl alcohol | 2.82 | very good | 142 |
| 13 | octadecyl alcohol | 2.91 | very good | 144 |
| 14 | octadecyl alcohol | 3.00 | very good | 140 |
| 15 | 2-ethoxy ethanol | 2.45 | good | 131 |
| 16 | 2-ethoxy ethanol | 2.64 | good | 135 |
| 17 | 1-decanol 5 wt % 2-ethoxy ethanol 5 wt % | 2.38 | good | 136 |
| 18 | 1-decanol 8 wt % 2-ethoxy ethanol 2 wt % | 2.53 | very good | 134 |
| 19 | 1-decanol 4 wt % 2-ethoxy ethanol 3 wt % 2-(2-ethoxyethoxy)ethanol 3 wt % | 2.61 | good | 137 |
| 20 | oleic acid | 5.98 | good | 55 |
| 21 | stearic acid | 7.03 | many scratches | 40 |
| 22 | no additives | 10.64 | numerous scratches | 100 |

The term "grinding rate" herein means an grinding amount in each case relative to the grinding amount of a thin film type magnetic head in the case of the free abrasive slurry composition containing no additives (with the proviso that the grinding amount of the latter case is 100).

From the results, it was found that when free abrasive slurry containing a compound having alcoholic hydroxyl group(s) is used in grinding, the PTR value of the ground thin film type magnetic head is lower than that in the case in which oleic acid, stearic acid or nothing is added (as in Comparative Examples), and the thin film type magnetic head composed of a composite material comprising materials of various hardness can be uniformly ground. In addition, it was found that in the case that the slurry containing fatty acid (oleic acid or stearic acid) is used, remarkable lowering of the grinding rate is observed, while in the case of free abrasive slurry containing a compound having an alcoholic hydroxyl group, the grinding rate is improved even when compared with the case of no additives. With respect to the grinding surface, the slurry with the compound having alcoholic hydroxyl group(s) obtained better results or the same results as compared with the results obtained in the case in which oleic acid, stearic acid or nothing is added. In addition, the grinding surface is especially good in the cases of 1-decanol and 1-tetradecanol.

When a thin film type magnetic head was ground using free abrasive slurry containing at least one compound having alcoholic hydroxyl group(s), the PTR value became lower than those in the case that oleic acid, stearic acid or nothing is added, and the thin film type magnetic head composed of a composite material comprising materials of various hardness was able to be uniformly ground. With respect to the grinding surface, the slurry with compound having alcoholic hydroxyl group(s) obtained better results or the same results as compared with the results obtained in the case in which oleic acid, stearic acid or nothing is added.

Example 11

In the present Example, PTR value, grinding surface and relative grinding rate were evaluated in the case that the amount of the compound having alcoholic hydroxyl group (s) is changed in the range of from 0 to 50 wt %. The same procedure was repeated as in Example 10 except that 1-decanol was used as the compound having alcoholic hydroxyl group. The results are shown in Table 5.

TABLE 5

| 1-decanol (wt %) | PTR (nm) | Grinding surface | Grinding rate |
|---|---|---|---|
| 0.1 | 2.89 | Good | 105 |
| 0.3 | 2.90 | Good | 105 |
| 0.5 | 2.82 | Good | 119 |
| 1.0 | 2.79 | very good | 122 |
| 3.0 | 2.71 | very good | 125 |
| 5.0 | 2.64 | very good | 130 |
| 10.0 | 2.65 | very good | 135 |
| 20.0 | 2.61 | very good | 134 |
| 30.0 | 2.67 | very good | 138 |
| 40.0 | 2.64 | Good | 138 |
| 50.0 | 2.62 | Good | 139 |
| no addition | 10.64 | Numeral scratches | 100 |

As is apparent from the results above, when the amount is 0.5 wt % or more, PTR value becomes smaller, and the selective grinding of a thin film type magnetic head comprising a composite material is prevented, and the condition of the grinding surface was good as compared with the case in which nothing was added (as in Comparative Example). Further, when the amount is 1.0 wt % or more, preferably 1.0–30.0 wt % or more, the grinding surface was in excellent condition without scratching or surface roughness.

From the results of Examples, it was found that by using free abrasive slurry containing at least one compound having alcoholic hydroxyl group(s), uniform grinding processing is possible without causing selective grinding of soft materials due to difference in hardness of materials contained in the composite material.

The present invention is explained in reference to the application to the thin film type magnetic head grinding, however, the present invention should not be construed to be limited to this type of grinding. The present invention can be applied to grinding of other composite material comprising materials of various hardness. Uniform grinding and higher grinding rate can be attained without causing difference in the grinding amount between different materials, by utilizing selective effect of an anti-abrasion agent (such as sulfur/ phosphorus compound) or a compound having alcoholic hydroxyl group(s), as an anti-selective grinding agent, on the material surface.

What we claim is:

1. A free abrasive slurry composition for grinding a composite material comprising materials of different hardness, said composition being non-aqueous and comprising abrasive particles, an anti-abrasion agent as an anti-selective grinding agent and a dispersion medium, wherein said anti-selective grinding agent is at least one selected from the group consisting of organic compounds having sulfur, phosphorus, or both sulfur and phosphorus in its molecular chain.

2. A free abrasive slurry composition according to claim 1, wherein said anti-selective grinding agent is one selected from the group consisting of: phosphoric ester represented by the following formula:

(R is alkyl or alkylaryl group)[,]; tricresyl phosphate (TCP) represented by the following formula:

tricresyl phosphite (TCPi); triphenyl phosphate (TPP); diphenyl phosphate (DPP); triphenyl phosphite (TPPi); diphenyl phosphite (DPPi); cresyldiphenyl phosphate (CDP); triallyl phosphate represented by the following formula:

trioleyl phosphate; molybdenum phosphoric ester; zinc dithiophosphate (Zn-DTP) represented by the following formula:

where R is an alkyl or alkylaryl group; phosphosulfrated polyolefin represented by following formula:

where R is an alkyl or alkylaryl group; barium thiopyrophosphate represented by the following formula:

where R is an alkyl or alkylaryl group; nickel thiophosphate represented by the following formula:

where R is an alkyl or alkylaryl group;
nickel dithiophosphate (Ni-DTP); cobalt dithiophosphate (Co-DTP); sulfurated fatty ester; isobutylene sulfide; sulfurated sperm oil; sulfurated terpene; sulfurated sperm oil; diphenyl monosulfide (DPMS); and diphenyl disulfide (DPDS).

3. The composition according to claim 1, wherein the amount of said anti-selective grinding agent is 0.1% by weight or more.

4. The composition according to claim 1, further comprising at least one member selected from the group consisting of a dispersant, a surfactant, a macromolecular surface modifier and a coupling agent.

5. A free abrasive slurry composition for grinding a composite material comprising materials of different hardness, said composition being non aqueous and comprising abrasive particles, a dispersion medium and at least one organic compound having alcoholic hydroxyl group as an anti-selective grinding agent.

6. The composition according to claim 5, wherein said compound having alcoholic hydroxyl group(s) is primary—tertiary alcohol represented by the following formula (I):

$$R^1\text{—OH} \tag{I}$$

where $R^1$ represents a $C_4$–$C_{18}$ alkyl group, an alkenyl group, an alkyl aryl group or an aryl group.

7. The composition according to claim 5, wherein said compound having alcoholic hydroxyl group(s) is polyoxyalkylene monoether compound represented by the following formula (II):

$$R^2O\text{—}(C_nH_{2n+1}O)_mH \tag{II}$$

where $R^2$ represents a $C_1$–$C_{18}$ alkyl group, an alkenyl group, an alkynyl group, an alkyl aryl group or an aryl group; n is an integer from 2 to 4; and m is an integer from 1 to 4.

8. The composition according to claim 5, wherein said compound having alcoholic hydroxyl group(s) is polyoxyalkylene monoester represented by the following formula (III):

$$R^3COO\text{—}(C_nH_{2n+1}O)_mH \tag{III}$$

wherein $R^3$ represents a $C_1$–$C_{18}$ alkyl group; n is an integer from 2 to 4; and m is an integer from 1 to 4.

9. The composition according to claim 5, wherein the amount of said anti-selective grinding agent is 0.5% or more.

10. The composition according to claim 5, further comprising at least one member selected from a group consisting of a dispersant, a surfactant, a macromolecular surface modifier and a coupling agent.

11. A method for producing a thin film magnetic head with an air bearing surface comprising materials of different hardness, comprising the step of grinding the air bearing surface with a free abrasive slurry composition according to claims 1 or 6.

* * * * *